US008266499B2

(12) United States Patent
Lincoln (10) Patent No.: US 8,266,499 B2
(45) Date of Patent: Sep. 11, 2012

(54) CRC PROTECTION OF DATA STORED IN XOR BUFFER

(75) Inventor: Bradford C. Lincoln, Boulder, CO (US)

(73) Assignee: Kabushiki Kaisha Toshiba, Tokyo (JP)

( * ) Notice: Subject to any disclaimer, the term of this patent is extended or adjusted under 35 U.S.C. 154(b) by 692 days.

(21) Appl. No.: 12/473,885

(22) Filed: May 28, 2009

(65) Prior Publication Data

US 2010/0306634 A1 Dec. 2, 2010

(51) Int. Cl.
*H03M 13/00* (2006.01)
(52) U.S. Cl. .................................. 714/758; 714/769
(58) Field of Classification Search .............. 714/758, 714/769
See application file for complete search history.

(56) References Cited

U.S. PATENT DOCUMENTS

| 5,410,546 | A  | * | 4/1995  | Boyer et al. ............. 714/763 |
| 6,820,228 | B1 | * | 11/2004 | Keller .................... 714/757 |
| 6,912,683 | B2 | * | 6/2005  | Rifaat et al. ........... 714/774 |
| 2008/0250297 | A1 | * | 10/2008 | Chung et al. ........... 714/758 |

* cited by examiner

*Primary Examiner* — M. Mujtaba K Chaudry
(74) *Attorney, Agent, or Firm* — Greer, Burns & Crain, Ltd.

(57) ABSTRACT

An XOR unit is provided in a hard disk controller for calculating an XOR of two operands stored in a buffer memory. The XOR unit includes an XOR calculator for calculating the XOR of the operands and a CRC of the XOR resulting from the calculation. An XOR buffer is also included in the XOR unit for storing the XOR result and the CRC of the XOR result, and a CRC calculator for calculating a CRC of the XOR result stored in the XOR buffer. The CRC calculated by the CRC calculator is compared with the CRC of the XOR result stored in the CRC buffer to determine whether the XOR result has been corrupted in the XOR buffer. The XOR result stored in the XOR buffer is determined to be corrupted if the CRC calculated by the CRC calculator and the CRC stored in the XOR buffer do not match.

17 Claims, 9 Drawing Sheets

CRC PROTECTION OF DATA STORED IN XOR BUFFER

FIELD OF INVENTION

The present invention relates to protection of data resulting from an XOR operation of two operands and stored in a buffer of a hard disk controller.

BACKGROUND OF THE INVENTION

In disk drives such as magnetic, optical and magneto-optical disk drives, there are commands that require the hard disk controller (HDC) to compute a bit by bit XOR of two data sources and save the result for purposes of computing redundant information for a RAID system. This typically involves reading the operands from and writing the result back to the system memory. When the system memory is a DRAM, it is more efficient to read and write data in bursts. A small buffer is used to hold the first data source while the second data source is read from the memory.

Figure 7:
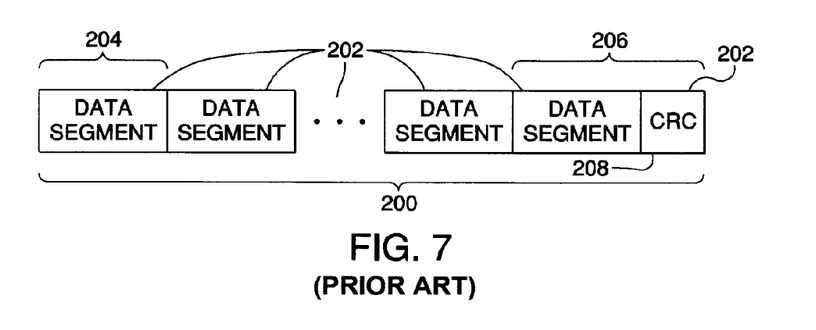
FIG. 7 is a diagram illustrating the components of a typical data sector.

As shown in FIG. 7, the size of a basic data unit or sector 200 in a disk drive is typically larger than the individual data segments 202 that make up the sector. When transferring the sector 200, individual segments are transferred separately beginning with a first segment 204 and ending with the last segment 206. Each segment 202 is transferred to or from a system memory in a single memory operation. The data sector 200 also includes a cyclic redundancy check (CRC) value 208 contained in the final data segment 206 as the final data in the segment. The CRC value 208 is used to detect data corruption that may have occurred in the sector 200.

Figure 8A:
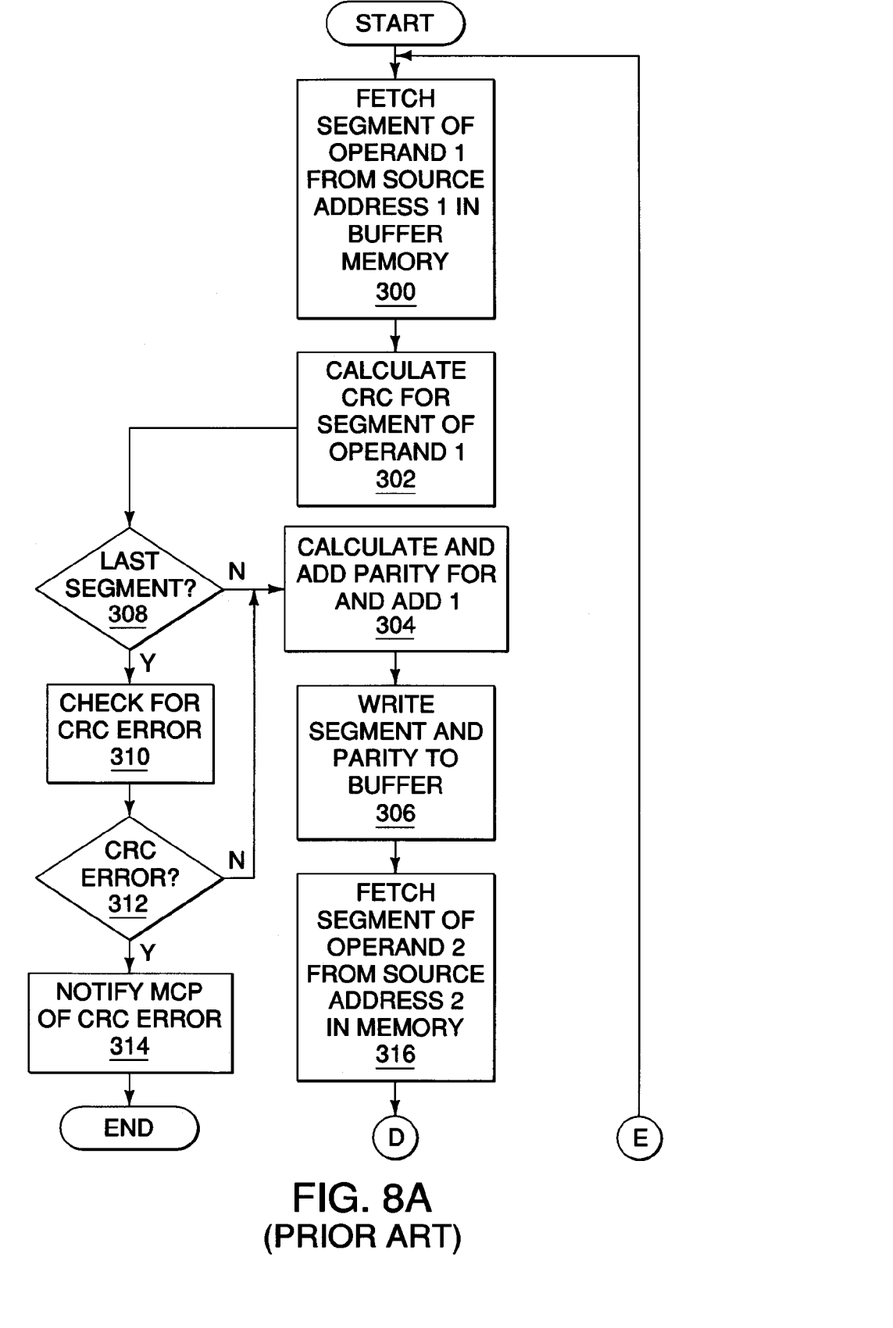
FIG. 8 is a flowchart describing a known process for protecting data in an XOR operation.
Figure 8B:
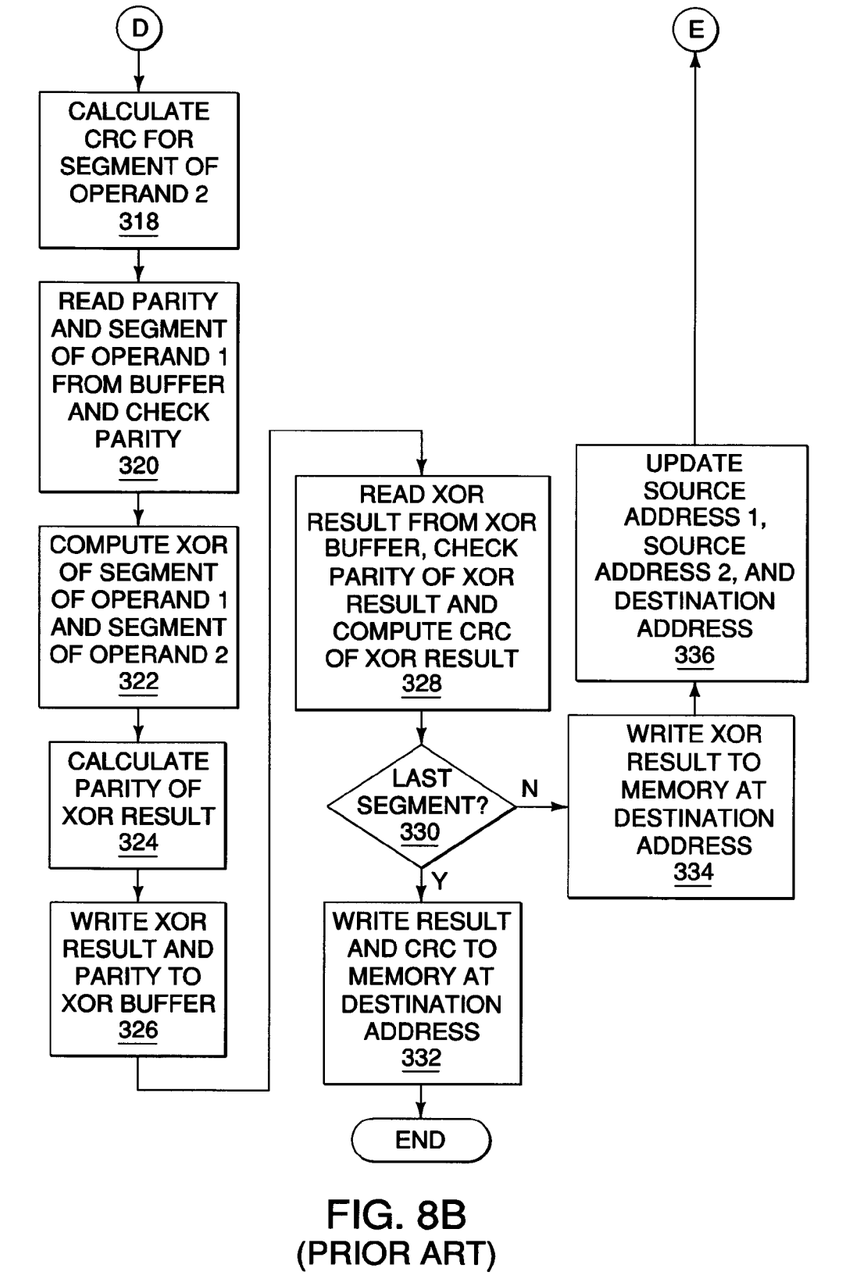

An example of a known process for performing an exclusive or logical (XOR) operation on two data sectors is shown in FIG. 8. The process starts by fetching a segment of the first data sector or operand 1 from source address 1 in the memory in which the data sector is stored (Block 300). A CRC (Block 302) and a parity (Block 304) for the segment are calculated. The segment and the parity are then written to a buffer (Block 306).

On the last segment 206 of operand 1 (Block 308), the calculated CRC value of the segment is compared against the CRC value 208 of operand 1 (i.e., the CRC value stored in the last segment of the sector 200) to check for a CRC error (Block 310). If an error is detected (Block 312), the main control processor of the disk drive is notified (Block 314) and the process comes to a halt. If no error is detected (Block 312), a parity is calculated for the last segment 206 of operand 1 (Block 304) and stored in the buffer along with the last segment (Block 306).

Each time a segment and a corresponding parity of operand 1 is written in the buffer, a corresponding segment from the second data sector or operand 2 is fetched from source address 2 in the memory (Block 316), and the CRC for this segment is calculated in the same way as for the segments in operand 1 (Block 318). The segment of operand 1 and the corresponding parity stored in the buffer are read and the parity is checked (Block 320). If no parity error is detected, the XOR of the segment of operand 1 and the corresponding segment of operand 2 is computed (Block 322), and the parity of the XOR result is calculated (Block 324). The result of the XOR operation and the parity is then written to the XOR buffer (Block 326).

The result of the XOR operation stored in the XOR buffer is then read, the parity is checked and the CRC is computed for the XOR result (Block 328) if no parity error is detected. On the last segment (Block 330), the XOR results and the CRC are written to the memory at the destination address of the memory (Block 332). On all segments prior to the last, the XOR result is written to the memory at the destination address of the memory (Block 334) and the source and destination address pointers are advanced by the segment size (Block 336).

As described above, a parity is used to detect data corruption that occurs in the XOR buffer in a known XOR operation. This requires making the XOR buffer 1 bit wider than the size the data to hold the parity bit, resulting in the XOR buffer being larger and more expensive.

SUMMARY OF THE INVENTION

The present invention is directed to an XOR unit provided in a hard disk controller for calculating an XOR of two operands stored in a buffer memory. The XOR unit includes an XOR calculator for calculating the XOR of the two operands and a CRC of the XOR resulting from the calculation. An XOR buffer stores the XOR result and the CRC of the XOR result, and a CRC calculator calculates a CRC of the XOR result stored in the XOR buffer. The CRC calculated by the CRC calculator is compared with the CRC of the XOR result stored in the CRC buffer to determine whether the XOR result has been corrupted in the XOR buffer. The XOR result stored in the XOR buffer is determined to be corrupted if the CRC calculated by the CRC calculator and the CRC stored in the XOR buffer do not match.

DETAILED DESCRIPTION OF THE PREFERRED EMBODIMENTS

Figure 1:
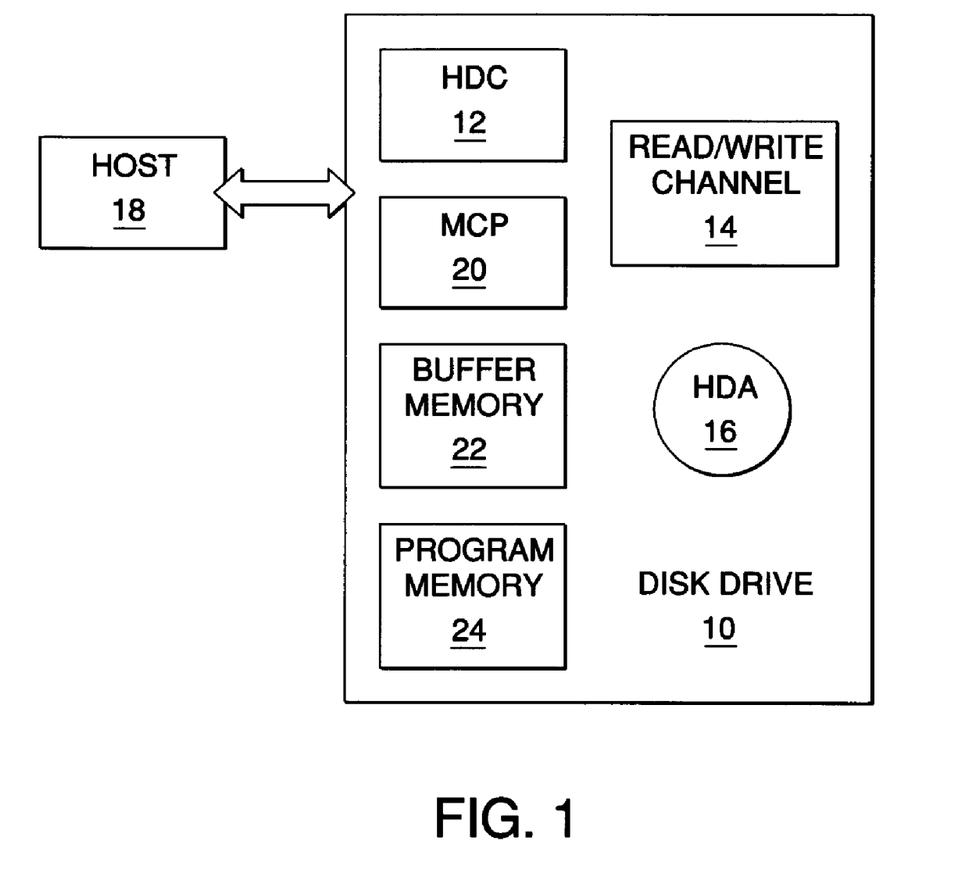
FIG. 1 is a block diagram of a disk drive in accordance with one embodiment of the present invention.

Turning now to FIG. 1, a disk drive 10 in accordance with one embodiment of the present invention includes a hard disk controller (HDC) 12, a read/write channel 14 and a head disk assembly (HDA) 16. The disk drive 10 may be magnetic, optical or magneto-optical disk drives, and is adapted to be communicatively connected to a host device 18 such as a computer.

The disk drive 10 further includes a main control processor (MCP) 20, a buffer memory 22 and a program memory 24. The MCP 20 is provided for the overall control of the disk drive 10 including control and management of the mechanical positioning of the read/write head(s) and rotational media (motor controls) in the HDA, management of the buffer memory 22 and its caching algorithms, control and setup of the read/write channel 14 and the host interface, for example. The program memory 24 stores programs and tables (not shown) used in accomplishing the above-mentioned MCP 20 responsibilities, including read channel and buffer management cache tables, codes to be executed by the MCP 20. The buffer memory 22 stores data used by the MCP 20 and the HDC 12 and user data to be transferred between the host device 18 and media in the HDA 16.

The program memory 24 is implemented in a non-volatile device such as a flash memory or a ROM. The HDA 16, although not shown in detail, includes one or more magnetic, optical or magneto-optical disks, a spindle motor for rotating the disks, read/write heads corresponding to the disks for reading data from and writing data on the disks and a head actuator for positioning the heads on the disks.

The read/write channel 14 is provided for translation of digital data from the HDC 12 to a format capable of being either written to, or read from the disk(s) in the HDA 16. In a disk write operation, the read/write channel 14 sends signals to the write head to cause magnetic transitions to be "written" to the disks. For a disk read operation, the read/write channel 14 decodes the signals from the read head generated by passing over the magnetic domains written on the disk. The transitions are detected and processed in a manner that allows them to be converted into a data format usable by the HDC 12 and the host device 18.

Figure 2:
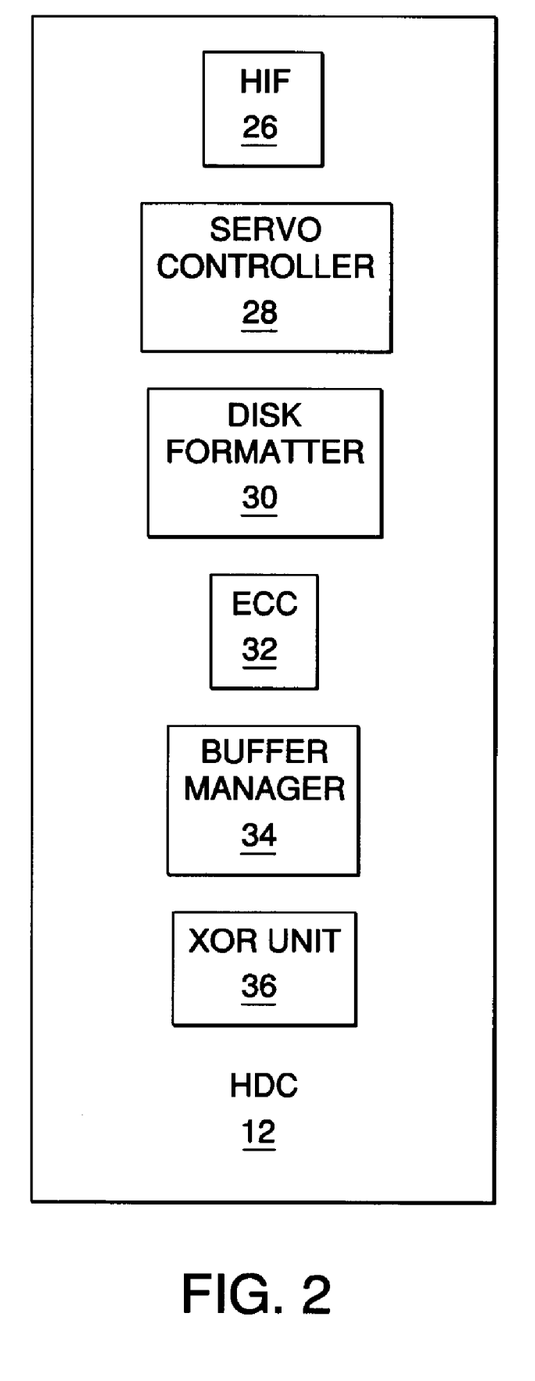
FIG. 2 is a block diagram of a hard disk controller in the disk drive shown in FIG. 1.

Turning to FIG. 2, the HDC 12 includes a host interface (HIF) 26 for processing commands from the host device 18, and accepting data from and transmitting disk data to the host device. Status to the host device 18 regarding successes and errors relating to the processing commands are also generated by the HIF 26. A servo controller 28 is provided for controlling the HDA 16 including the rotational speed of the spindle motor used to rotate the disks and positioning of the read/write head.

A disk formatter 30 transfers data from the buffer memory 22 to the read/write channel 14, or reads data from the disks and transfers to the buffer memory. The timing of when to write or read data to or from the disk is also controlled by the disk formatter 30. The disk formatter 30 communicates signals to the read/write channel 14 for an indication of when to process data.

An error correcting code (ECC) circuit 32 is provided for recovery of original data as it passes in and out of the disk formatter 30. A buffer manager 34 is used to interface between the HIF 26 and the buffer memory 22, or the disk formatter 30 and the buffer memory. The HIF 26 and disk formatter 30 make requests of the buffer manager 34 to either accept data and write it to the buffer memory 22, or to retrieve data from the buffer memory. Other components of the disk controller 12 may also have interfaces to the buffer manager 34 to be able to store and retrieve data from the buffer memory 22 including the ECC circuit 32. The buffer manager 34 responsibilities generally include management of the caching algorithms, which involves searching for a cache hit or miss for each command, and allocation of segments of the buffer memory 22 for different commands or sets of commands.

In accordance with one embodiment of the present invention, the HDC 12 further includes an XOR unit 36 for computing the XOR data or operands. In one embodiment the XOR unit 36 calculates the XOR of data in the buffer memory 22 received from the host 18 and data in the buffer memory read from the HDA 16 for use in RAID commands. It should be understood, however, that the XOR unit 36 may be employed in calculating the XOR of any of data in the disk drive 10. The XOR unit 36 is operatively connected to the buffer manager 34, through which data from the buffer memory 22 is received for computing XOR and data to be stored in the buffer memory is sent.

Figure 3:
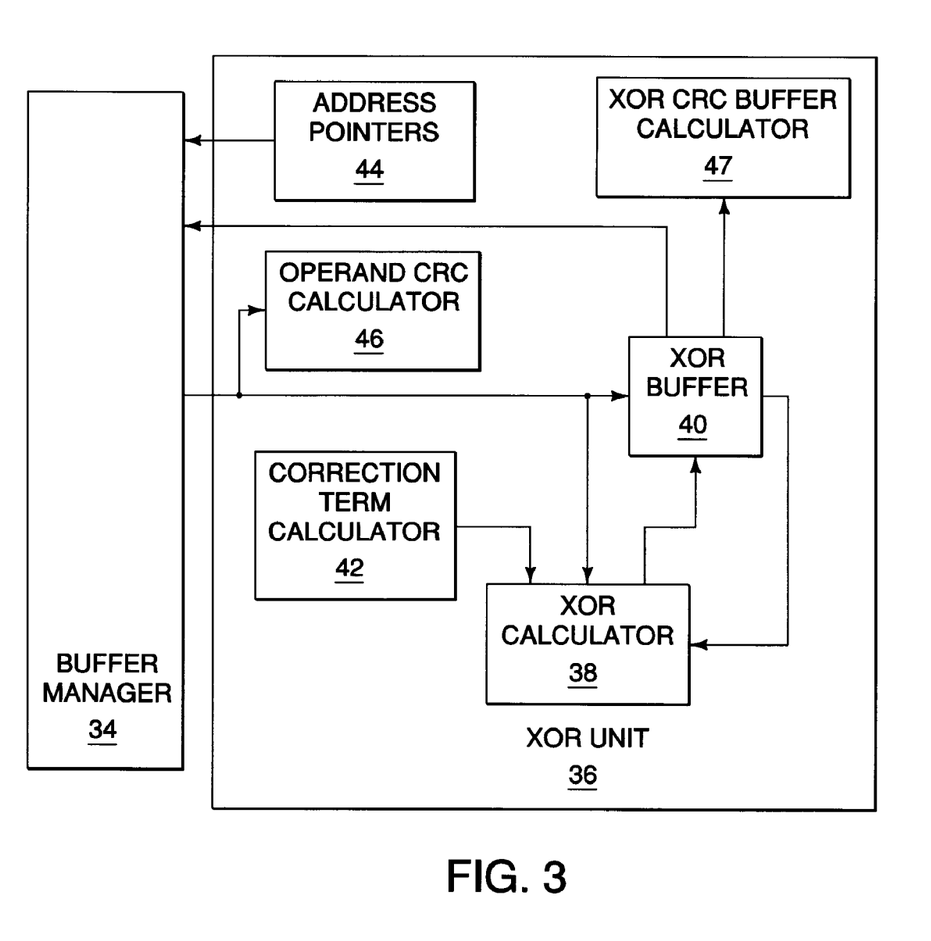
FIG. 3 is a block diagram of an XOR unit in the hard disk controller shown in FIG. 2.

As shown in FIG. 3, the XOR unit 36 includes an XOR calculator 38 for calculating the XOR of two different sectors of data or operands from the buffer memory 22, and an XOR buffer 40 for storing data to be used in or data resulting from an XOR operation. A correction term calculator 42 calculates a correction term used in calculating a CRC for data resulting from the XOR operation in the XOR calculator 38. An address pointer 44 is also provided in the XOR unit 36 for keeping track of the addresses of the data used in, and the destination address of data resulting from, the XOR operation. An operand CRC calculator 46 calculates the CRC for each of the two operands to detect any data corruption that may have occurred in the buffer memory 22. An XOR buffer CRC calculator 47 calculates the CRC for the XOR result stored in the XOR buffer 40 to detect any data corruption that may have occurred in the XOR buffer.

The CRC for each of the sectors of data or operands to be used in the XOR operation is computed as follows by the operand CRC calculator 46:

$$CRC(D) = (x^\wedge N * D(x) \oplus x^\wedge K * S(x)) \bmod G(x),$$

where D(x) is the data polynomial, K is the degree of D(x) (i.e., the total number of bits in all the data segments making up one sector), G(x) is the generator polynomial, N is the degree of G(x) and S(x) is the CRC initial value. All arithmetic is performed modulo 2 (equivalent to an XOR operation).

The CRC initial value S(x) used in one embodiment is the disk block number indicated by the host 18 in generating a RAID command. In this manner, the initial value can be reproduced since the XOR operation is performed as a part of a RAID command with an associated disk block number. The CRC initial value is the same for calculating the CRC for each of the sectors of data or operands used in an XOR operation, but varies from one XOR operation to the next depending on the disk block number indicated by the host computer 18. It should be understood that in an XOR operation not related to a RAID command, any initial value S(x) that can be reproduced may be used.

The CRC for data resulting from the XOR operation, i.e., the XOR result, is computed in accordance with the following equation by the XOR calculator 38:

$$CRC(A \oplus B) = (x^\wedge N * [A(x) \oplus B(x)] \oplus x^\wedge K * S(x)) \bmod G(x).$$

$$= CRC(A) \oplus CRC(B) \oplus C(x)$$

where a correction term $C(x) = [x^\wedge K * S(x)] \bmod G(x)$, A=operand 1, and B=operand 2.

As shown in this equation, the CRC of the XOR result is calculated directly from the CRCs of the data used in the XOR operation and the correction term C(x) that depends only on the CRC initial value S(x) and the length of the data.

The CRC for the data resulting from an XOR operation and stored in the buffer 40 is computed as follows by the XOR buffer CRC calculator 47.

$$CRC(R) = (x^\wedge N * R(x) \oplus x^\wedge K * S(x)) \bmod G(x),$$

where R(x) is the result of the XOR operation.

The XOR calculator unit 38 is implemented preferably as parallel XOR logic to match the width of the operands from the memory buffer 22 and the XOR buffer 40. As known to those skilled in the art, XOR function is commonly available in circuit libraries.

Figure 4:
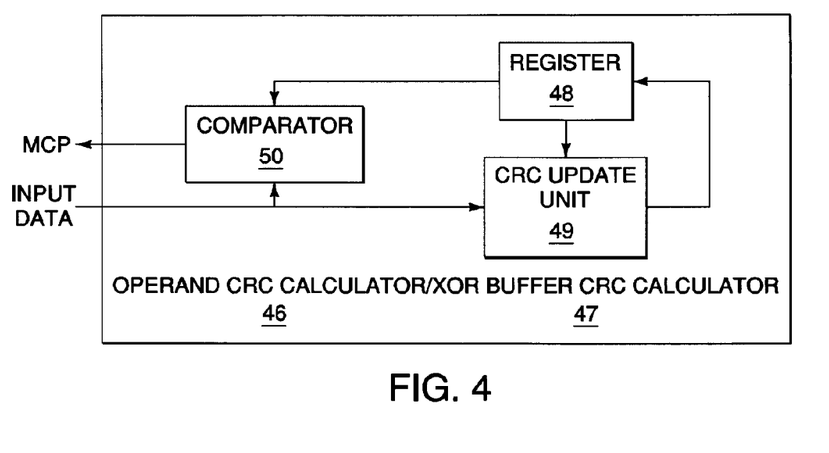
FIG. 4 is a block diagram of CRC calculators in the XOR unit shown in FIG. 3.

The operand CRC calculator 46 is shown in FIG. 4 and includes a register 48 that holds the result of a CRC calculation, a CRC update unit 49 for calculating the CRC of input data to be used in the XOR operation, and comparator 50 for comparing the CRC stored in the register with the CRC attached to the last data segment 206 of the data sector 200. The register 48 is the same width as the generator polynomial G(x).

At the start of a CRC calculation, the register 48 is loaded with the CRC initial value Sn(x). The CRC update unit 49 is a logic circuit that computes the function:

$$Un(X)=(x^N*Dn(x) \oplus x^Kw*Sn(x)) \bmod G(x),$$

where Dn(x) is a single word of a segment of the data sector from the buffer manger 34, n is the word index, Kw is the width of the word (e.g., 32 bits) and Sn(x) is the current value stored in the register 48. The output of the CRC update unit 49 is stored in the register 48. Accordingly, the CRC value of the register 48 is updated for each data word of the segments. Thus, Sn(x) is replaced when the first data word is processed, and the register 48 holds the CRC value of the entire data sector 200 after the next to last word in the last segment 206 of the data sector 200 is processed by the CRC update unit 49. The comparator 50 compares the CRC value in the last segment 208 with the CRC value stored in the register 48 after all the words of the data sector 200 have been processed.

The XOR buffer calculator 47 is identical to the operand CRC calculator 46 in structure and function, except that the input data (i.e., the XOR result) is received from the XOR buffer 40 rather than from the buffer manager 34. Thus, a separate description of the XOR buffer calculator 47 is not provided.

Figure 5:
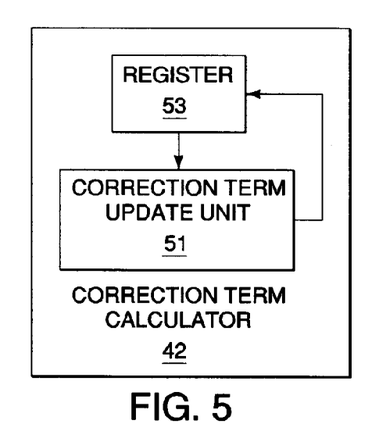
FIG. 5 is a block diagram of a correction term calculators in the XOR unit shown in FIG. 3.

Turning to FIG. 5, the correction term calculator 42 is implemented in a similar manner as the operand CRC calculator 46 except that the input data is zero (i.e., the update unit 51 computes the function Cn(x)=[x^K*Sn(x)] mod G(x)), and is not provided with a comparator. The correction term calculator 42 includes a correction term update unit 51 for obtaining a correction term for each data word of the segments 202. As in the operand and XOR buffer CRC calculators 46, 47, the initial value Sn(x) is replaced when the first data word is processed, and the register 53 holds the correction term for the entire data sector 200 when the next to last word in the last segment 206 of the data sector 200 is processed by the correction term update unit 51.

The XOR buffer 40 is implemented in an in-circuit RAM such as SRAM (static RAM), and is a memory sized to hold the length of data received from the buffer manager 34 in a single transaction. Address pointers 44 are registers holding the current address in the buffer memory 22 of operand 1, operand 2 and the result of the XOR operation.

Figure 6A:
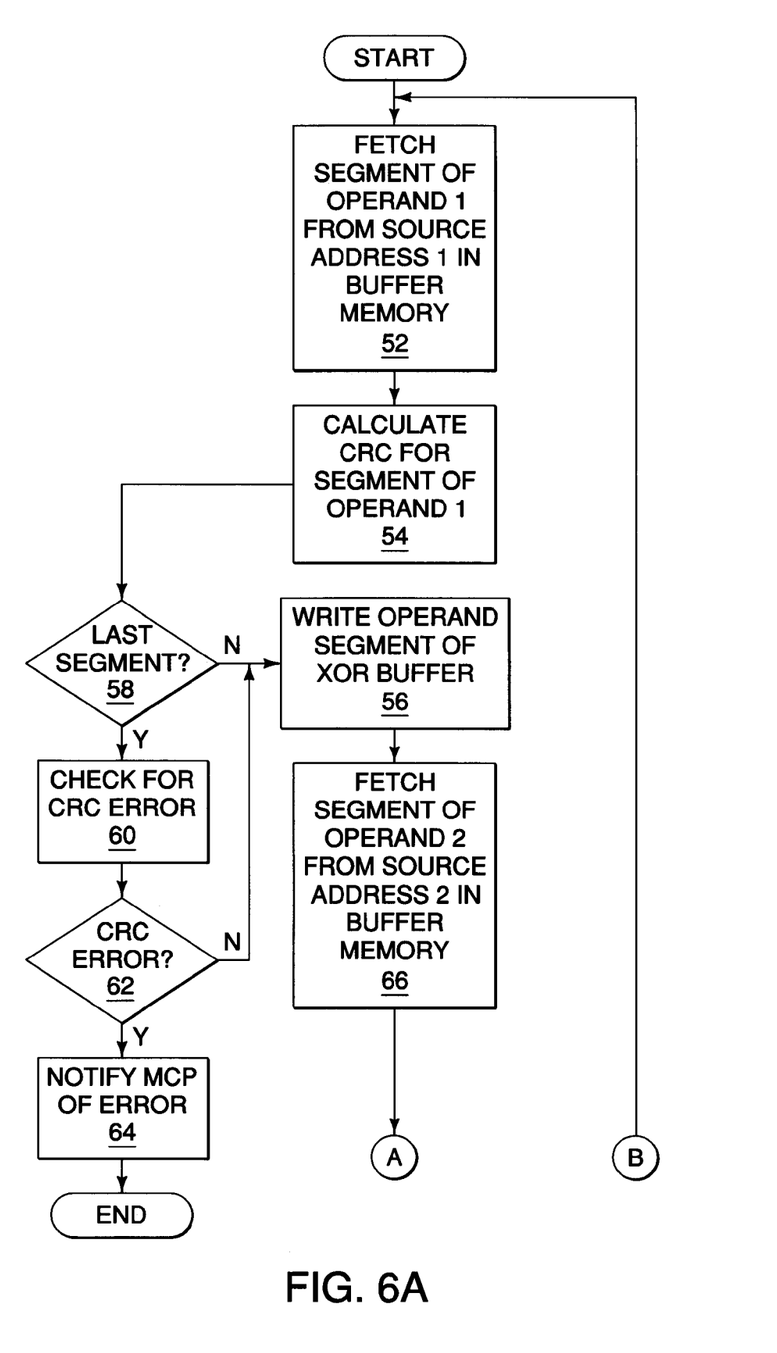
FIG. 6 is a flowchart describing the process for providing protection of data stored in an XOR buffer shown in FIG. 3, in accordance with one embodiment of the present invention.
Figure 6B:
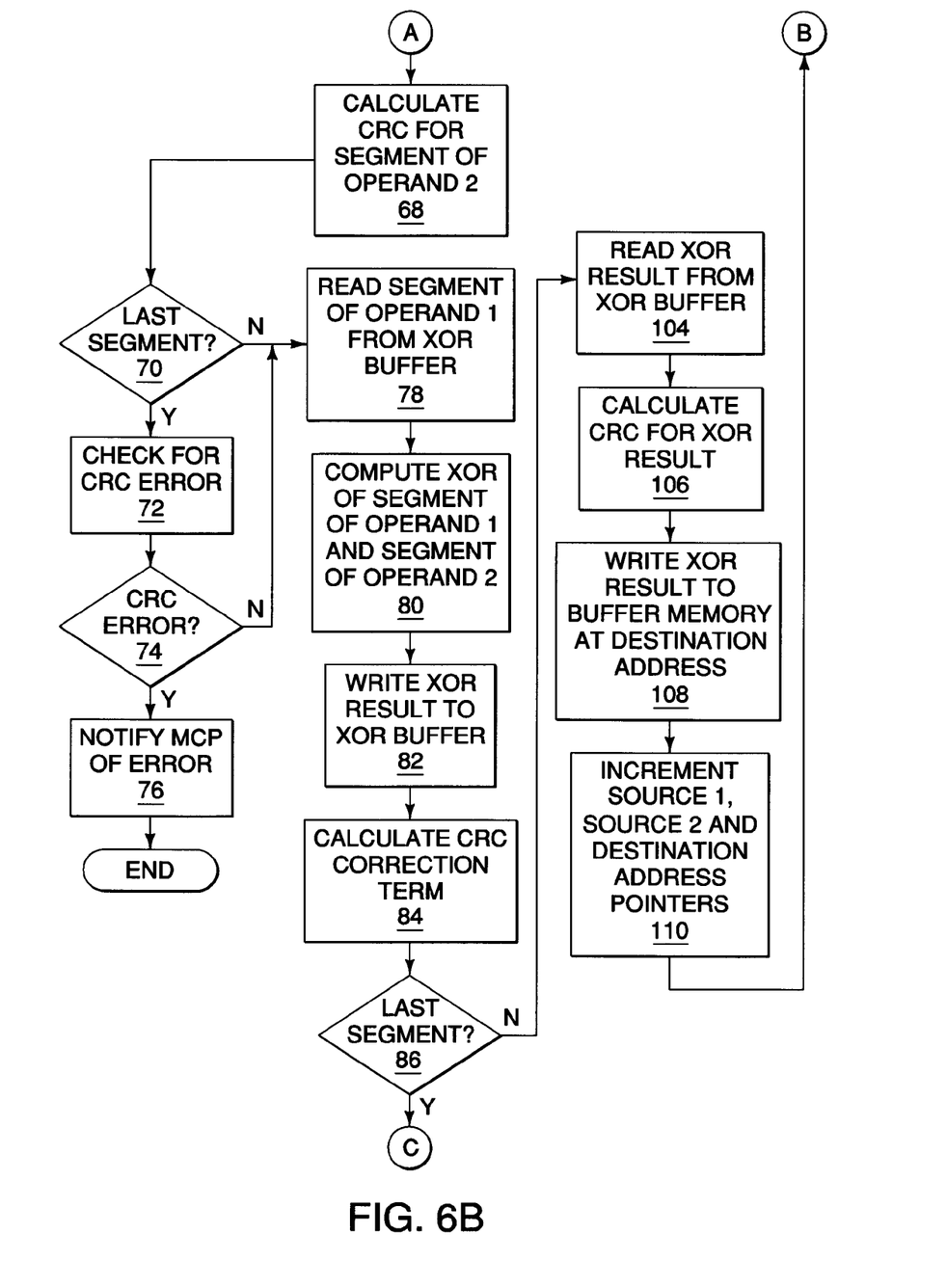
Figure 6C:
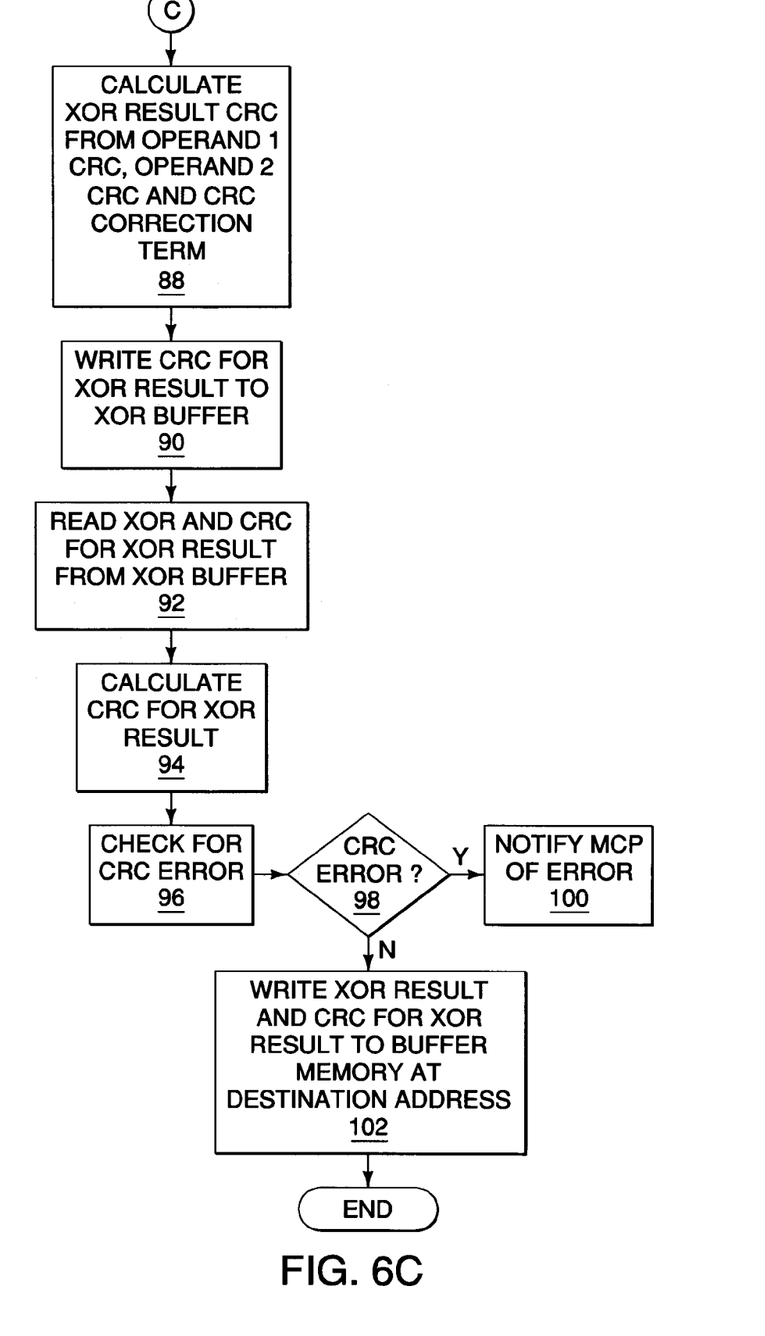

Referring now to FIG. 6, an operation of the XOR unit 36 is described in accordance with one embodiment of the present invention. At the start of an XOR operation, a segment of a data sector to be used in the XOR operation (i.e., operand 1) is fetched from the buffer memory 22 via the buffer manager 34 from the source address 1 (Block 52). Upon receiving the segment, the operand CRC calculator 46 calculates the CRC for the received data (Block 54). The segment of operand 1 is then written in the XOR buffer 40 (Block 56).

On the last segment of operand 1 (Block 58), the operand CRC calculator 46 compares the calculated CRC value of the last segment stored in the register 48 with the CRC value of operand 1 (i.e., the CRC value 208 stored in the last segment 206 of the data sector 200, as shown in FIG. 7) to check for a CRC error (Block 60). If an error is detected (Block 62), the main control processor (MCP) 20 of the disk drive 10 is notified (Block 64) and the process comes to a halt. If no error is detected (Block 62), the last segment is stored in the XOR buffer 40 (Block 56).

Each time a segment of operand 1 is written in the XOR buffer 40, a corresponding segment from a second data sector or operand 2 is fetched from a source address 2 in the buffer memory 22 (Block 66), and the CRC for this retrieved segment is calculated by the operand CRC calculator 46 (Block 68). On the last segment of operand 2 (Block 70), the operand CRC calculator 46 compares the calculated CRC value of the last segment stored in the register 48 with the CRC value of operand 2 (i.e., the CRC value 208 stored in the last segment 206 of the data sector 200 as shown in FIG. 7) to check for a CRC error (Block 72). If an error is detected (Block 74), the MCP 20 is notified (Block 76) and the process comes to a halt.

If no error is detected (Block 74) or if the segment from operand 2 is not the last segment (Block 70), the corresponding segment of operand 1 written in the XOR buffer 40 is read from the XOR buffer (Block 78), and the XOR of the segment of operand 1 and the corresponding segment of operand 2 is calculated by the XOR calculator 38 (Block 80). The result of the XOR operation is written to the XOR buffer 40 (Block 82), and the correction term is calculated by the correction term calculator 42 (Block 84).

Once the last segments of operand 1 and operand 2 have been received from the buffer memory 22 (Block 86), the XOR calculator 38 calculates the CRC value for the XOR result by performing an XOR operation of the operand 1 CRC value, the operand 2 CRC value and the CRC correction term (Block 88). The CRC value for the XOR result is written to the XOR buffer 40 (Block 90).

The XOR result including the CRC value for the XOR result is then read from the XOR buffer 40 (Block 92), and a CRC for the XOR result stored in the XOR buffer is calculated by the XOR buffer CRC calculator 47 (Block 94). The CRC (calculated by the XOR buffer CRC calculator 47) is compared with the CRC for the XOR result stored with the XOR result in the XOR buffer 40 (Block 96). If the CRC's are different, then an error has occurred (Block 98) and the MCP 20 is notified to stop the process (Block 100). If no error has occurred, (Block 98), the XOR result including the CRC value for the XOR result is sent to the buffer memory 22 at the destination address in the address pointer 44 (Block 102).

If the last segment has not been received (Block 86), the XOR result is read from the XOR buffer (Block 104), and a CRC for the XOR result is calculated by the XOR buffer CRC calculator 47 (Block 106). The XOR result is then sent to the buffer memory 22 at the destination address in the address pointer 44 (Block 108). The pointers 44 for the source addresses of operands 1 and 2 are incremented (Block 110) and the next segments of operands 1 and 2 to be used in the XOR operation are fetched.

In the present invention, using the CRC of the XOR result to check for data corruption in the XOR buffer instead of an XOR buffer parity allows the XOR buffer to be smaller since it is not necessary to accommodate a parity bit. The CRC of the XOR result is also able to detect any corruption in any of the data paths to or from the buffer memory or corruption in the XOR operation itself. The XOR buffer parity only detects corruption that occurs within the XOR buffer.

The embodiments and examples set forth herein were presented in order to best explain the present invention and its practical application and to thereby enable those skilled in the art to make and use the invention. Those skilled in the art will recognize that the foregoing description and examples have been presented for the purposes of illustration and example only. The description as set forth is not intended to be exhaustive or to limit the invention to the precise form disclosed. Many modifications and variations are possible in light of the above teaching without departing from the spirit and scope of the forthcoming claims.

Various features of the invention are set forth in the appended claims.

What is claimed is:

1. An XOR unit in a hard disk controller for calculating an XOR result of two operands stored in a buffer memory, comprising:
   an XOR calculator for calculating the XOR result of the operands;

a first CRC calculator for calculating a first CRC of the XOR result calculated by the XOR calculator;
an XOR buffer for storing the XOR result and the first CRC of the XOR result;
a second CRC calculator for calculating a second CRC of the XOR result stored in the XOR buffer,
wherein the second CRC of the XOR result calculated by the second CRC calculator is compared with the first CRC of the XOR result stored in the XOR buffer to determine whether the XOR result has been corrupted in the XOR buffer, the XOR result stored in the XOR buffer being determined to be corrupted if the second CRC of the XOR result does not match the first CRC of the XOR result.

2. The XOR unit as defined in claim 1, further comprising:
a correction term calculator for calculating a correction,
wherein the first CRC calculator calculates the first CRC of the XOR result from a CRC of each operand and the correction term.

3. The XOR unit as defined in claim 2, wherein the CRC of each operand is calculated as follows:

$$CRC(D)=(x^N*D(x) \oplus x^K*S(x)) \bmod G(x),$$

where $D(x)$ is a data polynomial, K is the degree of $D(x)$, $G(x)$ is a generator polynomial, N is a degree of $G(x)$, and $S(x)$ is a CRC initial value.

4. The XOR unit as defined in claim 3, wherein the CRC correction term is calculated as follows:

$$C(x)=(x^K*S(x)) \bmod G(x),$$

where K is a total number of bits in all data segments in a data sector, $G(x)$ is the generator polynomial, and $S(x)$ is the CRC initial value.

5. The XOR unit as defined in claim 4, wherein the first CRC of the XOR result is calculated as follows:

$$CRC(A \oplus B) = (x^\wedge N * [A(x) \oplus B(x)] \oplus x^\wedge K * S(x)) \bmod G(x).$$
$$= CRC(A) \oplus CRC(B) \oplus C(x),$$

where A and B are the operands used in the calculating the XOR result and $C(x)$ is the correction term.

6. The XOR unit as defined in claim 2, wherein the first CRC calculator comprises:
an update function unit for calculating a current CRC of the operands;
a register for storing the CRC calculated in the update function unit; and
a comparator for comparing the CRC stored in the register with the CRC of each of the operands.

7. The XOR unit as defined in claim 6, wherein the update function units calculates the current CRC of the operands as follows:

$$U(X)=(x^N*Dn(x) \oplus x^{Kw}*Sn(x)) \bmod G(x),$$

where $Dn(x)$ is a word of input data, n is the word index, Kw is a width of the word and $Sn(x)$ is a current value stored in the register.

8. The XOR unit as defined in claim 2, wherein the correction term calculator comprises:
an update function unit for calculating a current correction term; and
a register for storing the correction term calculated in the update function unit.

9. The XOR unit as defined in claim 8, wherein the update function units calculates the current CRC as follows:

$$C(x)=(x^K*Sn(x)) \bmod G(x),$$

where K is a total number of bits in all data segments in a data sector, $G(x)$ is a generator polynomial, and $S(x)$ is an initial value.

10. The XOR unit as defined in claim 1, wherein the second CRC calculator comprises:
an update function unit for calculating the second CRC of the XOR result;
a register for storing the second CRC calculated in the update function unit; and
a comparator for comparing the second CRC stored in the register with the first CRC of the XOR result.

11. The XOR unit as defined in claim 10, wherein the second CRC of the XOR result is calculated as follow:

$$CRC(R)=(x^N*R(x) \oplus x^K*S(x)) \bmod G(x),$$

where $R(x)$ is the XOR result, K is a total number of bits in all data segments in a data sector, $G(x)$ is a generator polynomial, N is a degree of $G(x)$, and $S(x)$ is a CRC initial value.

12. A method for checking for corruption in an XOR result calculated from an XOR operation of two operands and stored in a buffer, the method comprising:
calculating the XOR result of the two operands;
calculating a first CRC of the XOR result;
storing the XOR result and the first CRC of the XOR result in the buffer;
calculating a second CRC of the XOR result stored in the XOR buffer;
comparing the second CRC of the XOR result with the first CRC of the XOR result stored in the buffer to determine whether the XOR result has been corrupted in the buffer, the XOR result stored in the buffer being determined to be corrupted if the second CRC of the XOR result does not match the first CRC of the XOR result.

13. The method as defined in claim 12, wherein the first CRC of the XOR result is calculated from a CRC of each operand and a correction term.

14. The method as defined in claim 13, wherein the CRC of each operand is calculated as follows:

$$CRC(D)=(x^N*D(x) \oplus x^K*S(x)) \bmod G(x),$$

where $D(x)$ is a data polynomial, K is the degree of $D(x)$, $G(x)$ is a generator polynomial, N is a degree of $G(x)$, and $S(x)$ is a CRC initial value.

15. The method as defined in claim 14, wherein the correction term is calculated as follows:

$$C(x)=(x^K*S(x)) \bmod G(x),$$

where K is the total number of bits in all data segments in a data sector, $G(x)$ is the generator polynomial, and $S(x)$ is the CRC initial value.

16. The method as defined in claim 15, wherein the first CRC of the XOR result is calculated as follows:

$$CRC(A \oplus B) = (x^\wedge N * [A(x) \oplus B(x)] \oplus x^\wedge K * S(x)) \bmod G(x).$$
$$= CRC(A) \oplus CRC(B) \oplus C(x),$$

where A and B are the operands used in the calculating the XOR result and $C(x)$ is the correction term.

17. The method as defined in claim 12, wherein the second CRC of the XOR result is calculated as follow:

$$CRC(R)=(x^N*R(x) \oplus x^K*S(x)) \bmod G(x),$$

where $R(x)$ is the XOR result, K is a total number of bits in all data segments in a data sector, $G(x)$ is a generator polynomial, N is a degree of $G(x)$, and $S(x)$ is a CRC initial value.

* * * * *